June 13, 1961 C. J. FLETCHER 2,988,301
DUCTED FAN AIRCRAFT
Filed Oct. 28, 1958 2 Sheets-Sheet 1

*Charles J. Fletcher*
INVENTOR.

United States Patent Office 2,988,301
Patented June 13, 1961

2,988,301
DUCTED FAN AIRCRAFT
Charles J. Fletcher, 16 Cherry Tree Lane, Sparta, N.J.
Filed Oct. 28, 1958, Ser. No. 770,231
11 Claims. (Cl. 244—12)

This invention relates to improvements for a vertical rising aircraft of the ducted fan type.

Heretofore, various devices have been provided for annular wing aircraft designed to accommodate a pilot standing on an annular platform wing.

Still other types provide for an annular wing fixed to the fuselage which requires the pilot and passengers to pivot through an arc of approximately ninety degrees during translation from vertical to horizontal flight.

In either of the above cases no arrangement is provided wherein the ducted fan is utilized with an airfoil shaped body to provide a compact system to accomplish vertical flight as a helicopter or high speed flight as a conventional aircraft.

The principal object of this invention therefore is to provide a unique ducted fan type aircraft of new and novel arrangements embodying interconnecting moving or stationary parts, wherein the fuselage is of the airfoil type substantially rectangular in form and enclosing a ducted rotor for accomplishing both vertical and horizontal flight.

Another object of this invention is to permit the conversion from vertical to horizontal flight without subjecting the pilot to a rotating motion.

Still another object of this invention is to provide an aircraft having a fixed power system within the airfoil shaped fuselage capable of driving a counter rotating ducted rotor system which enables the aircraft to achieve vertical flight.

Another object of this invention is to provide for an aircraft having an airfoil shaped fuselage housing a ducted rotor which provides for a minimum center of gravity travel during translation from vertical to horizontal flight.

Another object of this invention is to provide for a more responsive aircraft by controlling aerodynamic control surfaces pivotally mounted at the base and within the blast of air generated by the ducted fan in such a manner as to direct the generated thrust forces in the direction best suited for a given flight condition.

Still another object of this invention is to provide for an aircraft of greater strength to weight ratio by use of an airfoil shaped structure comprising a large chord and short span.

Another object of this invention is to provide for an aircraft having a greater thrust to weight ratio by utilizing the ducted rotor principle.

Still another object of this invention is to provide for an aircraft wherein the resultant thrust force generated by the ducted rotor passes through a point substantially close to the aircraft center of gravity.

Still another object of this invention is to provide for an aircraft, wherein the center of pressure of the airfoil shaped body and the center of gravity of the aircraft lie substantially in a plane transverse to the longitudinal axis of said aircraft when the aircraft is in the forward flight position.

Still another object of this invention is to provide for an aircraft, having twin engine reliability.

Still another object of this invention is to provide for an aircraft which in general will be simple, inexpensive and of rugged construction to minimize initial cost and maintenance.

Still another object of this invention is to provide for an aircraft that can operate safely in and out of extremely confined areas.

Still another object of this invention is to provide for an aircraft that will be inherently stable and therefore easy to fly with relatively little training.

Still another object of this invention is to provide for aircraft comprising a ducted rotor system with pivotally mounted inlet air vanes to control the air flow to the rotor and to provide a means whereby the upper airfoil surface may be completely closed off during forward flight to provide a larger lifting airfoil surface.

Still another object of this invention is to provide for a ducted fan arrangement which can permit the aircraft to convert in a simple manner from vertical flight to forward flight.

Still another object of this invention is to provide for an aircraft having helicopter capabilities in vertical flight and have the capability of fighter aircraft performance in forward flight.

Another object of this invention is to provide for an aircraft combining the ducted fan and wing arrangement with end plates to improve the lifting capability for sustaining the weight of the aircraft during higher forward speed flight.

Another object of this invention is to provide for an aircraft having a power source which utilizes the exhaust gases at the end of the airfoil shaped fuselage for control jets.

These and other objects of the invention will be apparent by referring to the following specification and accompanying drawings, wherein.

Figure 1:
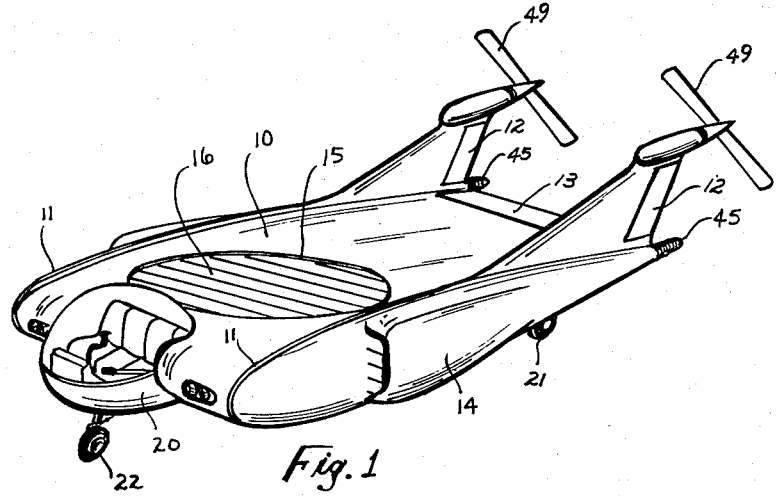
FIGURE 1 shows a three-quarter perspective view of the aircraft with propellers mounted at the upper rear portion of the tail fins.
Figure 2:
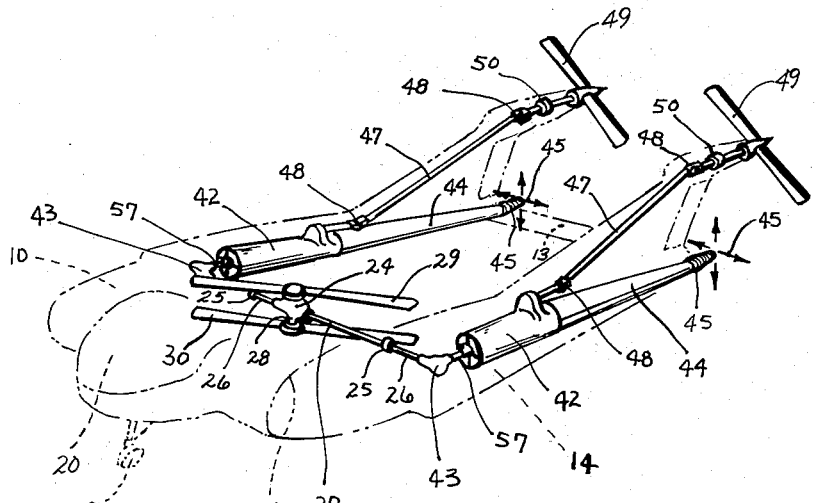
FIGURE 2 shows a phantom view of the aircraft shown in FIGURE 1 with the ducted fan rotor and power system exposed.

Referring more particularly to the drawings wherein similar reference characters designate like parts throughout the several views, FIGURE 1 shows a perspective view of a ducted fan aircraft wherein the fuselage 10 comprises a cross section having an airfoil shape. The lateral sides of the fuselage 10 are provided with end plates 11 which tend to confine the air flow over the fuselage 10. The end plates 11 help to eliminate tip losses and also serve as fins for directional stability during forward flight. The rear end of the end plates 11 provide a rudder control surface 12 which provides yaw control during forward flight. The trailing edge of the fuselage 10 provides an elevator surface 13 which provides pitch control during forward flight. Referring now to FIGURE 2, at approximately the 30–60 percent chord point of the fuselage 10, the end plates 11 are provided with a protruded section 14 which houses the powerplant (not shown). A duct 15 is positioned with its center line at approximately the 30 percent chord line of fuselage 10, i.e., the duct axis intersects the longitudinal axis of the aircraft at a position corresponding to 25–35 percent of the chord. During vertical flight the ducted rotor 29 and 30 draws air through the duct 15 and generates sufficient lift to allow the aircraft to take off vertically. Referring to both FIGURES 1 and 2 the upper surface of the duct 15 is provided with a series of aerodynamically shaped air inlet vanes 16 arranged laterally across the inlet to the duct 15. During vertical flight, the vanes 16 are rotated to a vertical position allowing air to flow through the ducted rotor 29 and 30. Once the aircraft has taken off vertically, a powerplant 42 housed within nacelle 14 drives propellers 49 allowing the aircraft to accelerate forward. At the moment airfoil shaped fuselage 10 starts to generate sufficient lift to support the aircraft weight, the inlet vanes are rotated to the closed position (as shown), thus increasing the total upper lifting surface. During transitional flight, when the air flow across the fuselage 10, rudders 12 and elevators 13 is not adequate to control the aircraft, the airflow generated by the propeller 49, permits auxiliary tail surface 19 and elevators 13 to achieve yaw and pitch control respectively. The leading edge of the air foil shaped fuselage 10 is provided with a pilot and passenger pod 20 and permits excellent visibility during all flight conditions. Wheels 21 and 22 permit the aircraft to rest horizontally and allow the aircraft to be moved about while on the ground.

A more detailed review of FIGURE 2 shows the turbo prop powerplants 42 coupled to an intermediate gear box 43 by means of shaft 57 which drives intermediate gear box 43 which in turn drives the rotor transmission 24 via shafts 26, clutch 25, and shafts 27. Power shafts 28 of transmission 24 drives rotors 29 and 30 which generates the necessary lift to achieve vertical and transitional flight of the basic airfoil body 10. The primary advantage of the turboprop power system is the fact that a greater power to weight ratio can be obtained. Also, by utilizing the exhaust gases which pass through conduit 44, pitching and yaw control moments can be obtained by deflecting these gases either vertically or laterally through a pair of exhaust gas control nozzles 45 positioned outboard at the trailing edge of the airfoil shaped fuselage 10. The deflected gases are represented by typical arrows 46.

To achieve forward flight, powerplants 42 are also provided with drive shaft 47 connected by universal joints 48 which in turn drives propellers 49. Once a safe forward speed is obtained with the ducted rotors 29 and 30, such that adequate lift is being generated by the airfoil shaped fuselage 10 to sustain the weight of the aircraft, clutches 25 are disengaged to discontinue power to the ducted rotors 29 and 30. Simultaneously, clutches 50 are engaged directing power to propellers 49 thus permitting the aircraft to be driven at a higher forward rate of speed.

Figure 3:
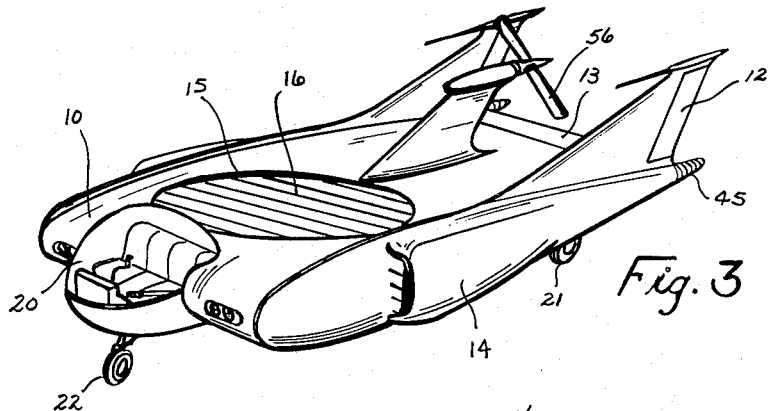
FIGURE 3 shows a three-quarter perspective view of a second embodiment of the aircraft having turbo prop power plants and a propeller mounted centrally above and rearward of the duct rotor.
Figure 4:
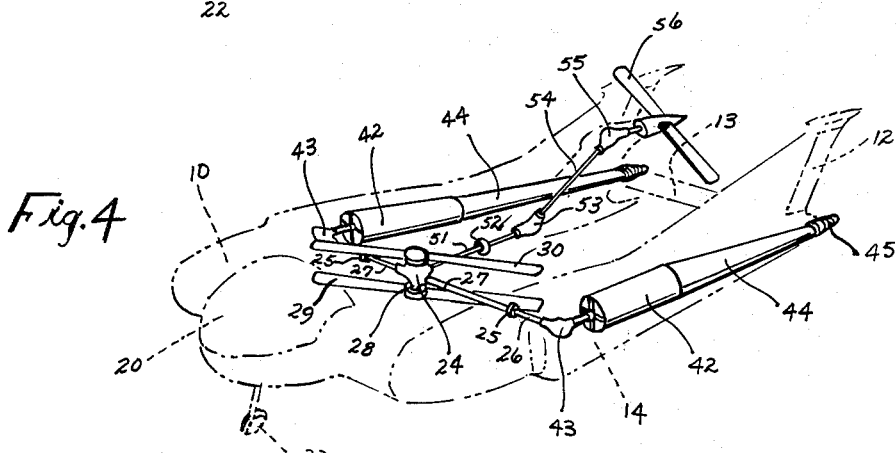
FIGURE 4 shows a three-quarter perspective view of the aircraft shown in FIGURE 3 with the turbo power plant and drive system exposed.

A second embodiment of basic design is shown in FIGURE 3. This configuration is similar to the aircraft shown in FIGURES 1 and 2 except that the forward propulsion system comprised a single propeller located centrally aft and above the duct. As shown in FIGURE 4, the ducted rotor transmission 24 is provided with a third power output shaft 51 which transmits power through a clutch 52, gearbox 53, drive shaft 54, and gearbox 55 which in turn drives propeller 56. This power system permits the transmission 24 to shift the power from the ducted rotors 29 and 30 to drive shaft 51 thereby permitting full power from turbo prop engines 42 to drive propeller 56 for purposes of obtaining a maximum speed during forward flight.

Figure 5:
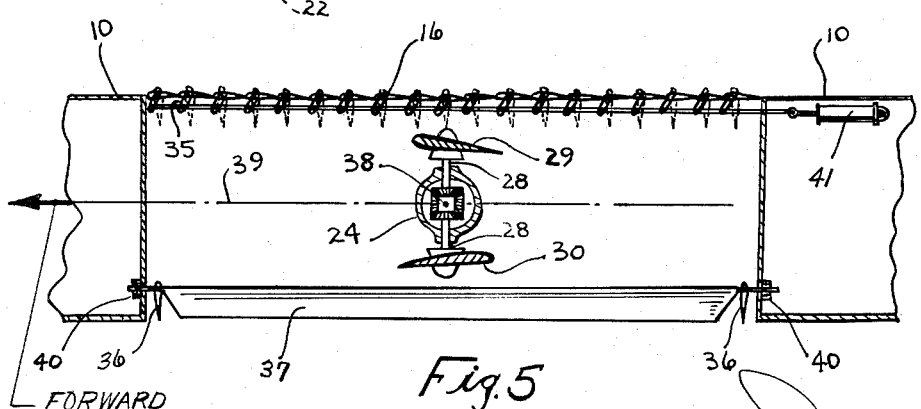
FIGURE 5 shows a longitudinal cross section through the ducted rotor shown in FIGURES 2 and 4.

For purposes of clarity, all aircraft shown in FIGURES 1, 2, 3, and 4 employ the same ducted rotor control system which consists of control surfaces 36 and 37 shown in FIGURE 5.

Referring now to FIGURE 5, during vertical flight vanes 16 mounted on bearings 35 are rotated downward as shown by the dotted line. Air generated by the counter-rotating rotors 29 and 30 is drawn through the vanes 16 and is ejected downward over control surfaces 36 which provide pitching control moments about the aircraft lateral axis 38, and over the control surfaces 37 which provide rolling control moments about the aircraft longitudinal axis 39. Each end of control surfaces 36 and 37 is pivotally mounted on bearings 40 for ease of movement.

Once the aircraft has accelerated forward to a speed capable of generating suitable lift on the airfoil shaped fuselage 10, a control means (not shown) permits an actuator 41 to close the vanes 16 thereby increasing the total upper lifting surface of airfoil shaped fuselage 10.

It shall be understood that the above illustrations and descriptions of the construction and arrangements of interconnecting moving and stationary parts forms a typical configuration embodying new and salient features hereinafter claimed of the invention, but that modifications may be made to the construction and parts hereto without departing from the spirit of the invention.

I claim:

1. An aircraft comprising an airfoil shaped body substantially rectangular in plan form, a duct positioned within said body and having its axis of symmetry positioned substantially vertical with respect to the chordwise axis of the body, a thrust generating means housed within said duct for creating a blast of air therethrough, and power means being operatively connected to said thrust generating means; a fin connected to the lateral sides of said body and extending from substantially the leading edge to the trailing edge and constituting means for confining the flow of air over said airfoil shaped body, one or more propellers positioned aft of said duct for generating a flow of air rearwardly over said body between the spanwise boundary formed by said fin.

2. In an aircraft: a wing rectangular in plan form comprising the principle aerodynamic lifting surface of the aircraft and having a central circular opening, the axis of symmetry of said opening being disposed rearward with respect to said wing leading edge so as to substantially coincide with the chordwise location of the center of pressure of said wing, a rotor operatively mounted in said opening and constituting means for directing a rapid flow of air downward into said opening, whereby lift is created, one or more propellers positioned aft of said opening for generating a flow of air over said wing.

3. In an aircraft: a wing rectangular in plan form having a circular opening; a duct extending downwardly from said opening; a downwardly thrusting rotor operatively mounted in said duct; a plurality of inlet vanes operatively mounted and laterally disposed over said opening, and constituting means for directing a flow of air into said rotor; whereby thrust is generated by said rotor, and means for controllably tilting the vanes relative to said wing, whereby the downward flow of air on said opening is regulated and directed to improve the lifting ability over said wing during transition to higher speed flight and providing for maneuverability of the aircraft, one or more propellers positioned aft of said opening for generating an additional flow of air rearwardly over said wing and said vanes over and above that quantity generated by said rotor alone.

4. In an aircraft: a wing rectangular in plan form having a substantially central circular opening therein; the longitudinal cross section of said wing from leading edge to trailing edge being that of a lift producing airfoil having a maximum thickness positioned substantially chordwise so as to coincide with the axis of symmetry of said opening; a plurality of inlet vanes each comprising an airfoil cross section, said vanes being operatively mounted and laterally disposed over said opening; a duct extending downwardly from said opening; a downwardly thrusting rotor operatively mounted in said duct and constituting means for directing a flow through said vanes, whereby lift may be created on said vanes; one or more propellers positioned aft of said opening for generating an additional flow of air over said vanes over and above that quantity generated by said rotor alone; and means for controllably tilting the vanes relatively to said wing, whereby the lift of one vane is altered with respect to the simultaneous lift on another vane and thus providing for control of the aircraft.

5. In an aircraft: a wing rectangular in plan form having a substantially central circular opening therein;

the longitudinal cross section of said wing from leading edge to trailing edge being of air foil contour capable of producing lift and having a maximum thickness positioned substantially chordwise so as to coincide with the axis of symmetry of said opening; a plurality of inlet vanes aerodynamically shaped so as to produce lift; and means for controllably changing the angle of attack of said vanes with respect to said wing; a duct extending downwardly from said opening; a downwardly thrusting rotor operatively mounted in said duct generating a flow for producing lift on said vanes, one or more propellers positioned aft of said opening for generating an additional flow of air over said vanes over and above that quantity generated by said rotor alone.

6. In an aircraft: a wing rectangular in plan form having a substantially central circular opening therein; the longitudinal cross section of said wing from leading edge to trailing edge being of air foil contour capable of producing lift and having a maximum thickness positioned substantially chordwise so as to coincide with the axis of symmetry of said opening; a plurality of inlet vanes aerodynamically shaped so as to produce lift; and means for controllably changing the angle of attack of said vanes with respect to said wing; a duct extending downwardly from said opening; a downwardly thrusting rotor operatively mounted in said duct generating a flow for producing lift on said vanes; a plurality of control surfaces positioned within said duct below said rotor; and means for controllably deflecting the surfaces with respect to the vertical axis of said wing, whereby said flow may be displaced sufficiently to create maneuverability of the aircraft, one or more propellers positioned aft of said opening for generating an additional flow of air over said vanes over and above that quantity generated by said rotor alone.

7. In an aircraft: a wing rectangular in plan form comprising the principal aerodynamic lifting surface of the aircraft and having a central circular opening with its axis of symmetry intersecting a locus of points on the upper surface of said wing defining the center of pressure of said wing; a duct extending downwardly from said opening; a rotor operatively mounted in said duct and constituting means for directing a rapid flow of air downward into said opening, whereby lift is created by the thrust generated by said rotor; a plurality of aerodynamic vanes pivotally mounted and laterally disposed over said opening, means for controllably changing the angle of attack of said vanes with respect to said wing, one or more propellers positioned aft of said opening for generating an additional flow of air over said vanes over and above that quantity generated by said rotor alone, a powerplant operatively connected to said rotor; an exhaust conduit leading from said powerplant consittuting means for directing a flow of exhaust gases to the trailing edge of said wing; an exhaust control positioned at the rearward end of said conduit, and means for controllably directing said exhaust gases, whereby said wing stability may be maintained thus providing for maneuverability of the aircraft.

8. An aircraft comprising an airfoil shaped body substantially rectangular in plan form, a duct positioned within said body, a thrust generating means housed within said duct for creating a blast of air therethrough, and power means in the aircraft for operating said thrust generating means, whereby said thrust generating means is capable of producing a resultant thrust vector that will pass substantially through the center of gravity of said aircraft; a plurality of aerodynamic vanes pivotally mounted and laterally disposed over said duct, means for controllably changing the angle of attack of said vanes with respect to said wing, one or more propellers positioned aft of said duct for generating an additional flow of air over said vanes over and above that quantity generated by said thrust generating means alone; an exhaust conduit leading from said power means constituting means for directing a flow of exhaust gases to the trailing edge of said body, an exhaust control positioned at the rearward end of said conduit; and means for controllably directing said exhaust gases, whereby said body stability may be maintained, a vertical fin comprising a rudder control surface operably mounted on the rearward end of said fin; a pilot and passenger pod on the forward portion of said body.

9. In an aircraft: a wing rectangular in plan form having a circular opening therein; the longitudinal cross section of said wing from leading edge to trailing edge being that of an efficient lift producing airfoil having its central chord twenty-five percent to thirty-five percent position constituting the approximate location of the axis of symmetry of said opening; a downwardly thrusting rotor operatively mounted in said opening; a plurality of aerodynamic vanes pivotally mounted and laterally disposed over said opening, means for controllably changing the angle of attack of said vanes with respect to said wing, whereby the flow of air into said rotor and the lift generated on said vanes may be altered thus providing for maneuverability of the aircraft, one or more propellers positioned aft of said opening for generating a flow of air over said vanes over and above that quantity generated by said rotor alone.

10. In an aircraft: a wing rectangular in plan form having a circular opening therein; the longitudinal cross section of said wing being that of an efficient lift producing airfoil having its central chord center of pressure position constituting the approximate location of the axis of symmetry of said opening; a downwardly thrusting rotor operatively mounted in said opening; a plurality of aerodynamic vanes pivotally mounted and laterally disposed over said opening, means for controllably changing the angle of attack of said vanes with respect to said wing, whereby the flow of air into said rotor and the lift generated on said vanes may be altered, thus providing for maneuverability of the aircraft; streamlined fins being positioned along each side of said wing and protruding above and below the contour of said airfoil; whereby the flow of air passing over said wing may be of confined within the boundary established between said fins; a powerplant in said aircraft; an exhaust conduit extending from said powerplant to the trailing edge of said wing; an exhaust control nozzle operably mounted on the rearward end of said conduit; and means for controllably directing the exhaust gases from said nozzle; whereby further maneuverability may be provided for the aircraft.

11. In an aircraft: a wing rectangular in plan form having a circular opening therein; the longitudinal cross section of said wing being that of an efficient lift producing airfoil having its central chord center of pressure position constituting the approximate location of the axis of symmetry of said opening; a downwardly thrusting rotor operatively mounted in said opening; a plurality of aerodynamic vanes pivotally mounted and laterally disposed over said opening, means for controllably changing the angle of attack of said vanes with respect to said aircraft, whereby the flow of air into said rotor and the lift generated on said vanes may be altered, thus providing for maneuverability of the aircraft; streamlined fins being positioned along each side of said aircraft and protruding above and below the contour of said airfoil; whereby the flow of air passing over said wing may be confined within the boundary established between said fins; a powerplant in said aircraft; an exhaust conduit extending from said powerplant to the trailing edge of said wing; an exhaust control nozzle operably mounted on the rearward end of said conduit; and means for controllably directing the exhaust gases from said nozzle; whereby further maneuverability may be provided for the aircraft; a passenger pod on the forward portion of said wing; and generally rearwardly thrusting propulsion means operatively mounted on said wing.

(References on following page)

References Cited in the file of this patent

UNITED STATES PATENTS

| | | |
|---|---|---|
| 1,749,272 | Bird | Mar. 4, 1930 |
| 2,455,385 | Schairer | Dec. 7, 1948 |
| 2,561,291 | Rethorst | July 17, 1951 |
| 2,567,392 | Naught | Sept. 11, 1951 |
| 2,736,514 | Ross | Feb. 28, 1956 |
| 2,879,957 | Lippisch | Mar. 31, 1959 |

OTHER REFERENCES

Flight Magazine (London), February 1957, vol. 75, number 2618, pages 155 and 156.